US011947936B2

(12) United States Patent
Patel et al.

(10) Patent No.: US 11,947,936 B2
(45) Date of Patent: *Apr. 2, 2024

(54) USER INTERFACE COMMON COMPONENTS AND SCALABLE INTEGRABLE REUSABLE ISOLATED USER INTERFACE

(71) Applicant: Capital One Services, LLC, McLean, VA (US)

(72) Inventors: Kush Patel, Austin, TX (US); Jiaxin Guo, Plano, TX (US); Venkatasudharsan Dasa, Frisco, TX (US); Gopi Kancharla, Frisco, TX (US); Justin Pitz, Frisco, TX (US); Charles E. Smith, Van Alstyne, TX (US)

(73) Assignee: Capital One Services, LLC, McLean, VA (US)

( * ) Notice: Subject to any disclaimer, the term of this patent is extended or adjusted under 35 U.S.C. 154(b) by 395 days.

This patent is subject to a terminal disclaimer.

(21) Appl. No.: 17/317,139

(22) Filed: May 11, 2021

(65) Prior Publication Data
US 2021/0326122 A1    Oct. 21, 2021

Related U.S. Application Data

(63) Continuation of application No. 16/871,387, filed on May 11, 2020, now Pat. No. 11,023,213, which is a (Continued)

(51) Int. Cl.
*G06F 8/38*      (2018.01)
*G06F 3/0481*    (2022.01)
*G06F 8/41*      (2018.01)

(52) U.S. Cl.
CPC .............. *G06F 8/38* (2013.01); *G06F 3/0481* (2013.01); *G06F 8/41* (2013.01)

(58) Field of Classification Search
CPC ............ G06F 8/38; G06F 8/41; G06F 3/0481
See application file for complete search history.

(56) References Cited

U.S. PATENT DOCUMENTS

| 7,441,188 B1 * | 10/2008 | Russell | G06F 8/38 715/273 |
| 2003/0158855 A1 * | 8/2003 | Farnham | G06Q 10/10 707/999.102 |

(Continued)

*Primary Examiner* — Jacob D Dascomb
(74) *Attorney, Agent, or Firm* — KDW Firm PLLC

(57) ABSTRACT

Disclosed are examples related to building a customized data collection widget. Building of the customized data collection widget includes receiving a selection of several universal modules for inclusion in the widget. Each universal module of the selected several universal modules may include programming code that causes rendering of userfillable data fields on a display, and a summary page including data requirements of the respective universal module. Based on the data requirements in a summary page of each respective universal module of the selected several universal modules, the selected several universal modules retrieved from a module repository may be combined in a customized data collection container stored in a composite repository. The selected customized data collection container may be combined with selected other data collection containers to form a uniquely identifiable, customized data collection widget. The customized data collection widget may be delivered to the composite repository.

20 Claims, 7 Drawing Sheets

Related U.S. Application Data continuation of application No. 16/435,699, filed on Jun. 10, 2019, now Pat. No. 10,649,745.

(56) References Cited

U.S. PATENT DOCUMENTS

2016/0085793 A1* 3/2016 Davis .................. G06F 16/986
  707/690
2021/0241371 A1   8/2021 Diana

* cited by examiner

310 — Receive a selection of several universal modules for inclusion in a widget presented on a website

320 — Retrieve the selected several universal modules from a module repository

330 — Combine the selected several universal modules in a customized data collection container based on the data requirements in the summary page of each respective universal module

340 — Store the customized data collection container in a composite repository with a plurality of other data collection containers

350 — Select the customized data container and one or more other data collection containers from the plurality of other data collection containers

360 — Combine the selected customized data container and the selected one or more other data collection containers to form a customized data collection widget

370 — Deliver the customized data collection widget to a composite repository

- 510 — Receive a widget delivery request for delivery of a service (data collection) widget to a client browser
- 520 — In response to the widget delivery request, delivering the service widget to the client browser
- 530 — Receive from the service widget a services request that includes information related to an item available for purchase and information relate for the item-related services
- 540 — In response to an analysis of the information related to the item available for purchase, receiving an indication from the network of the enterprise that the item available for purchase meets a purchase threshold of the enterprise
- 550 — Fetch an authentication token from the client backend system
- 560 — Upon confirmation that the fetched authentication token is valid for the client backend system, deliver the services request to an enterprise evaluation server
- 570 — Receiving an evaluation result including parameters of the item-related services with respect to the item available for purchase from the enterprise evaluation server
- 580 — In response to receiving an evaluation result from the enterprise evaluation server, transmit to the client backend a confirmation message confirming the enterprise will provide the item-related services

USER INTERFACE COMMON COMPONENTS AND SCALABLE INTEGRABLE REUSABLE ISOLATED USER INTERFACE

RELATED APPLICATIONS

This application is a continuation of U.S. patent application Ser. No. 16/871,387, filed on May 11, 2020, which is a continuation of U.S. patent application Ser. No. 16/435,699, now U.S. Pat. No. 10,649,745, filed on Jun. 10, 2019, both titled "USER INTERFACE COMMON COMPONENTS AND SCALABLE INTEGRABLE REUSABLE ISOLATED USER INTERFACE". The contents of the aforementioned applications are incorporated herein by reference in their entirety.

BACKGROUND

When entities deal with on-line users via the entities' websites, the respective entities usually prefer to provide their own user experience to guide a user through processes that may involve obtaining endorsement from one or more external enterprises. The entities as well as users that interact on-line with the respective entities usually prefer clear, secure methods for inputting information, especially personal information, to the respective entity's website. This is particularly true with entity websites in which the user may have had minimal previous interaction and therefore limited trust.

Some special services, such as credit checking, lending qualification or prequalification, identity confirmation, email services and the like, may be provided by an enterprise external to the entity through "widgets" that execute via the entity's website. A widget may be a separate computer application that provides a service obtained from a separate widget host enterprise, and that is called from an entity's website. A user selects a button on the website that launches the widget on the user's web browser.

However, with respect to each other, entities typically use different internal or external website developers to produce and update the respective entity's website and related programming code, such as the widgets. Because of using different developers, the generation of widgets by an external enterprise for each entity website is cumbersome and adds high maintenance costs. For a large entity having multiple different business units each with their own websites, the resulting websites and the generated widgets may lack consistency and uniformity across the multiple business units of the entity. Integration between the widget, the websites, entity site backend, and the backend of the widget host must be simple or risk additional maintenance costs. The lack of consistency and uniformity may perhaps lead to frustration and user disappointment in the performance of the website and widgets.

SUMMARY

Disclosed is an example of a system that includes a memory, a module repository, a composite repository and a pipeline processing component. The memory stores programming code. The module repository may store a number of universal modules that make up a data input and presentation flow. Each universal module includes computer application code that renders information on a display, data fields that store data and a summary page of data requirements for each universal module. The composite repository may store a number of data collection containers. Each container of the plurality of data collection containers may include two or more universal modules from the plurality of universal modules. The pipeline processing component may be coupled to the memory, the module repository, and the composite repository. The pipeline processing component is operable to execute the programming code stored in the memory. When executing the programming code, the pipeline processing component performs functions to select a first universal module from the number of universal modules stored in the module repository. The selected first universal module is operable to obtain first data from a user interface. A second universal module may be selected from the plurality of universal modules stored in the module repository. The selected second universal module is configured to obtain second data from the user interface. Data dependencies are identified between the second universal module and the first universal module. Based on the identified data dependencies, the selected second universal module may be coupled to the first universal module to form a first set of coupled universal modules. A data collection container is populated with the first set of coupled universal modules, and a unique identifier identifies the data collection container. The data collection container populated with the first set of coupled universal modules is stored in the composite repository.

Also disclosed is a method that includes receiving a selection of several universal modules for inclusion in a widget presented on a website. Each respective universal module of the selected several universal modules may include executable programming code that causes rendering of user-fillable data fields on a display device, and a summary page including data requirements of the respective universal module. The selected several universal modules may be retrieved from a module repository. Based on the data requirements in a summary page of each respective universal module of the selected several universal modules, the selected several universal modules may be combined in a customized data collection container. The customized data collection container may be stored in a composite repository with a number of other data collection containers. Each of the other data collection containers of the plurality of other data collection containers includes one or more universal modules. The customized data collection container and one or more other data collection containers may be selected from the plurality of other data collection containers. The selected customized data collection container and the selected one or more other data collection containers may be combined to form a customized data collection widget. The customized data collection widget may be delivered to a composite repository. The customized data collection widget is uniquely identifiable from other widgets stored in the composite repository.

An example of a non-transitory computer-readable storage medium storing computer-readable program code executable by a processor is disclosed. Execution of the computer-readable program code causes the processor to receive a selection of several universal modules for inclusion in a widget presented on a website. Each respective universal module of the selected several universal modules includes executable code and a summary page. The executable programming code causes rendering of user-fillable data fields on a display device and presentation elements related to user-fillable data fields, and the summary page includes data requirements of the respective universal module. The selected several universal modules may be retrieved from a module repository. Based on data requirements in a respective summary page of each respective universal module, the selected several universal modules may be combined in a customized data collection container. The customized data collection container may be stored in a composite repository with a number of other data collection containers. The customized data collection container and one or more other data collection containers may be selected from the number of other data collection containers. The executable programming code of respective universal modules may be combined in the selected customized data collection container and the selected one or more other data collection containers to form a customized data collection widget. The combined executable programming code may include client style code and universal style code as presentation elements into the executable programming code that builds a customized data collection widget having a substantially unique appearance when presented in a browser. The customized data collection widget may be delivered to a composite repository. The customized data collection widget is uniquely identifiable from other widgets stored in the composite repository.

BRIEF DESCRIPTION OF THE DRAWINGS

FIG. 3 illustrates an example of a flowchart of an interactive process that obtains and utilizes a widget to receive services.

FIG. 5 illustrates an example of a flowchart of a process for constructing a widget utilizing universal modules.

DETAILED DESCRIPTION

Figure 1:
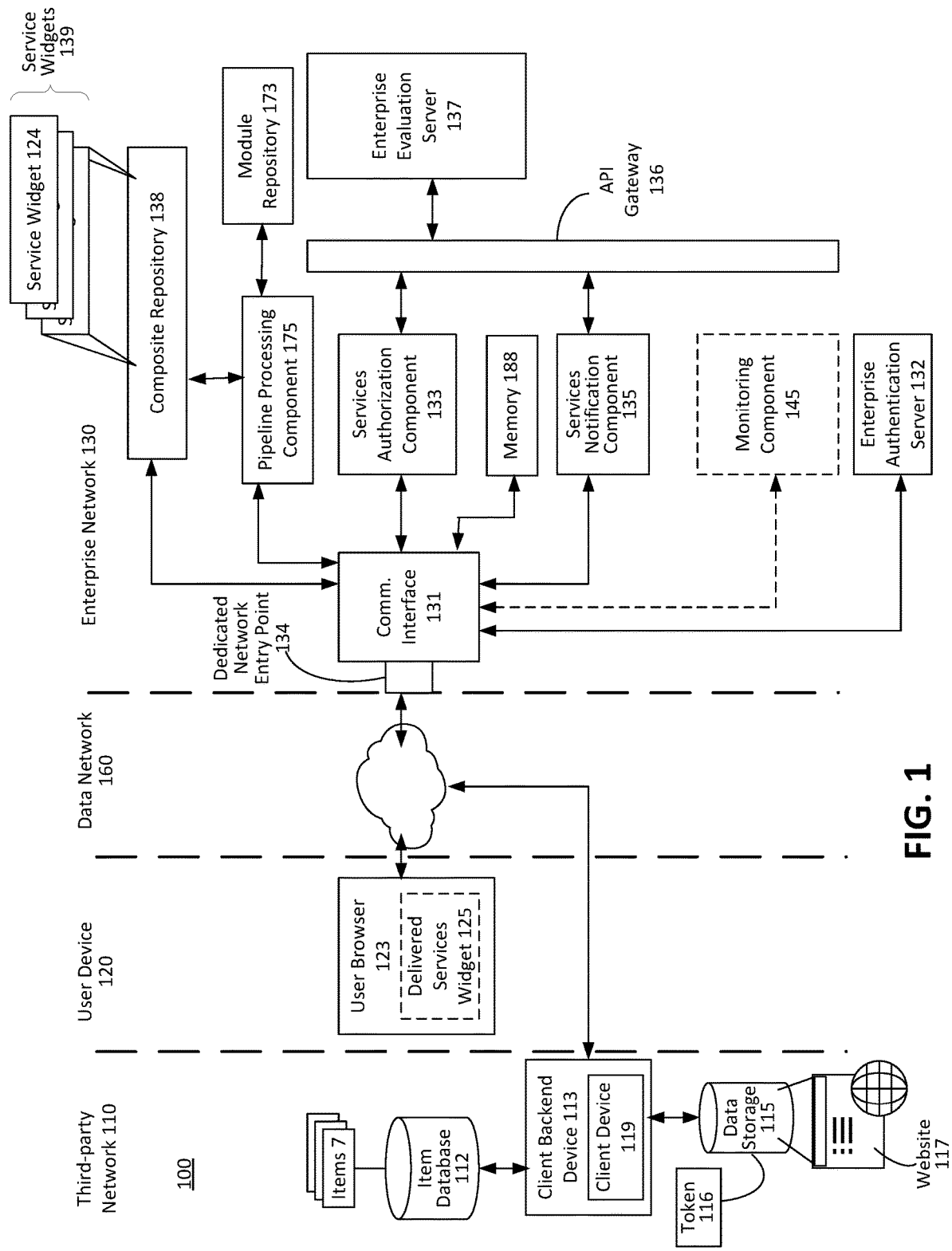
FIG. 1 illustrates an example of an interactive system that builds widgets and supplies the widgets for use according to the disclosed examples.

To build trust between a user and an entity, it would be beneficial to develop a tool and techniques that enable an entity web developer to create a widget that can support dynamic customer data input and presentation flow of a widget and integration of the widget through simplified backend and customer-facing processes throughout a data input and a service provision process. Simple and successful widget integration provides confidence in data security and integrity to all involved parties. In the examples, a widget may be a computer application with limited functionality that can be installed to a webpage and executed within the webpage by an end user. A widget may have a role as a transient or auxiliary application that occupies a portion of a webpage and does something useful with information obtained from the end user and information fetched from other websites or services. The obtained and fetched information may be rendered in a portion of the webpage.

The disclosed examples provide a solution to the foregoing problems by allowing each entity (e.g. a third party in some examples) to have their custom experience flow (also referred to as data input and presentation flow) depending on their preferences for a user experience. The disclosed examples provide techniques and systems that may enable a website developer to generate a widget the provides a process for providing a service, such as a prequalification process for an auto loan to purchase a vehicle, a patient check-in process in an on-line medical environment, a settlement process in a real estate environment, or the like. Standardizing and simplifying the respective example processes enable accelerating the use of the respective website and widgets by users. The provided techniques and systems have many practical applications for use by different third-parties and enterprises. The third-party may desire to provide widgets on their website that are aesthetically appealing when opened by a user and have a familiar transition through various screens of the widget. In addition, the widget provides data integrity and data security aspects during interaction with an enterprise that provides a service to the third party and a user of the third-party website via the widget.

For example, in an automobile dealer example, a dealer may benefit from services enabled by an independent financial services enterprise for qualifying or prequalifying a customer via the dealer website for financing of a vehicle provided by the dealer. The use of a dealer website with a customized enterprise-supported widget may contribute to dealership growth by improving the user experience and by driving more potential users to dealer websites. The customized enterprise supported widget may be configured specific to the dealer requests to provide a flow and aesthetic that is seamless for the customer. For example, dealer websites require support and an ability to construct and integrate widgets into the dealership's website that seamlessly guide customers through the web site and provide a satisfying user experience that includes the user's experience with the widget. The experience for one dealer may be different for another dealer, and thus it may be challenging and not scalable for a service provider supporting the widget to support such custom experiences for tens, hundreds, thousands, etc. of dealer websites. The example techniques enable a service provider to provide or support a custom widget for each dealer website in an improved, scalable way. The automobile dealer and financial services provider example is but one example of a practical application of the techniques, apparatuses, and systems that are described with reference to FIGS. 1-7.

FIG. 1 illustrates an example of an interactive system that builds widgets and supplies the widgets for use according to the disclosed examples. The interactive system 100 may include multiple other systems, such as a third-party network 110, at least one user device 120, a data network 160, and an enterprise network 130.

The third-party network 110 may include a client backend device 113 that is coupled to a client device 119. The client backend device 113 may be coupled to an item database 112 and a data storage 115. The item database 112 may contain, for example, items, such as items 7, available via the third-party network 110. The items 7 may be items available for purchase, items available for borrowing or the like. The data storage 115 may store, for example, a master version of a third-party website 117, security-related information, such as an authentication token (i.e., "token") 116, as well as other information, such as user log-in information or the like.

The client backend device 113 is coupled to a data storage 115 and an item database 112. The data storage 115 stores, for example, the authentication token 116 for the client backend device 113 and the website 117 as well as other information and data. The client backend device 113 may host the third-party website 117 that is stored in the data storage 115. The website may be populated with items for purchase or presentation from the item database 112. Items 7 may be items for purchase, such as automobiles, collectibles, real estate, jewelry, groceries, or the like, or may be high-value items to borrow that may require collateral, for example, to permit the borrowing.

The client device 119 may enable third-party network 110 web developers to utilize the widget building capabilities provided by the enterprise network 130 as explained in more detail below. In addition, or alternatively, the client device 119 may enable a user, such as a third-party network administrator, for example, to access information within the third-party-network 110 and interact with the enterprise network. Similarly, the third-party website 117 may connect via a widget popup window button (shown in another example) to the enterprise network 130. For example, the third-party website 117 may access services or information in a platform or component, such as the service authorization component 133, within the enterprise network 130 to call a service widget 124 (also referred to as a data collection widget in other examples). To allow access to the enterprise network 130, the enterprise network 130 may authenticate the client device via an authentication process, such as OAuth or the like. One of the benefits of authentication is that it enables scalability and is a first step in security.

Correctly identifying and authenticating third-party sites calling a platform or component in the enterprise network 130 is germane to scalability and security purposes. For example, most third-party client backend devices 113 and the third-party website 117 may need to "onboard" (e.g., provide verifiable credentials and fulfill security requirements in exchange for the authentication token) with the enterprise network 130. The authentication token 116 may contain information identifying the third party, who is the entity responsible for the third-party network 110, and that may be sent for each call to the enterprise network 130. For example, the authentication token 116 may be evaluated to either grant or invalidate the client associated with the third party by a backend layer (not shown) of the enterprise network 130 via configuration information stored in an internal database within memory 188, on the frontend layer (not shown) of the enterprise network 130 by whitelisting domains that can fetch the widget from the composite repository 138, or by some other technique. For example, whitelisting (i.e., explicitly allowing access by a known and trusted entity) of the third-party website 117, for example, may be beneficial because it serves as a first layer of defense by preventing sites that do not comply with the platform (not shown) standards of the enterprise network from displaying the widget on a user browser 123.

The user device 120 may include a user browser 123 and, in some examples as explained with reference to other examples, a delivered services widget 125. For example, the user browser 123 of the user device 120 may host the delivered services widget 125. In some examples, the services widget 125 may be a JavaScript file or the like that contains programming code. When the programming code is executed, the services widget 125 may perform functions such as those described in more detail with reference to the example of FIG. 5.

The data network 160 may be the internet, a cellular network or another data network that enables connection of devices, such as the user browser 123 client backend device 113, and the enterprise network 130, to one another.

The enterprise network 130 may include several components, such as a composite repository 138, a pipeline processing component 175, a module repository 173, a communication interface 131, a services authorization component 133, a services notification component 135, an application program interface (API) gateway 136, an enterprise evaluation server 137, a memory 188, and an enterprise authentication server 132. The enterprise network 130 may optionally include a monitoring component 145 operable to monitor activities of users of a services widget. For example, the monitoring component 145 may collect metrics related to the user behavior from the monitored activities; and store the collected metrics in a data storage, such as memory 188.

The communications interface 131 may be coupled to the third-party network 110 via a dedicated network entry point 134. The dedicated network entry point 134 may be, for example, a single network entry point through which devices external to the enterprise network 130 may communicate with and access the systems and components of the enterprise network 130, such as the composite repository 138, the services authorization component 133, services notification component 135, or the enterprise evaluation server 137. In some examples, the dedicated network entry point 134 may be implemented as a proxy layer which controls the data that can be requested by a third-party website for security purposes. The proxy layer may filter personal data to create a secure interface to communicate personal customer data with other parties. The proxy layer implemented the dedicated network entry point 134 may be a single point for any dealer site to call for sending and receiving data to the backend platform. This single point creates a seamless, simple, and scalable method for submitting prequalification applications to be processed by an enterprise network 130, for example. The proxy layer can fetch application information, decision offers for a customer, and process vehicle pricing information to service any customer's flow through the prequalification process. Alternatively, the dedicated network entry point 134 may be several highly secured entry points to prevent unauthorized access to the enterprise network 130.

The API gateway 136 may be a component that similarly functions as a single point of entry for services provided by the enterprise evaluation server 137 and among other functions may provide protocol translations to enable clients to make use of multiple different APIs. The API gateway 136 may, for example, be coupled to the services authorization component 133, the services notification component 135, and the enterprise evaluation server 137.

The composite repository 138 may store a number of service widgets 139. Each service widget, such as service widget 124, of the number of service widgets 139 may be operable to collect data from the user browser 123 and provide the collected data to an enterprise evaluation server 137 for evaluation and processing (examples of which are described with reference to examples of FIGS. 4 and 5.

The services notification component 135 may be coupled to the user browser 123 via the communications interface 131 and provide notifications to the client backend device 113, the user browser 123, the delivered services widget 125 as well as components and systems within the enterprise network 130, such as the pipeline processing component 175.

The services authorization component 133 may be coupled via the communication interface 131 to the third-party network 110 and the user browser 123. In addition, the services authorization component 133 may be coupled via the API gateway and an enterprise evaluation server. In some examples, the service authorization component 133 may receive user data from a delivered service widget 125 executing in the user browser 123. For example, the delivered services widget 125 may access the services authorization component 133 via a dedicated network entry point 134 of the communication interface 131 for the enterprise network 130.

In an operational example, the user browser 123 may access a website 117 offered by the third-party network 110 available through the data network 160. A user may review via the user browser 123 an item available for purchase through the client backend device 113 of third-party network 110.

Continuing with the example, the user via the user browser 123 may interact with the website provided by the third-party network 110. The user browser 123 may, in response to inputs to the website provided by the third-party, may send a widget delivery request to the enterprise network 130 for a services widget. The communication interface 131 may forward the request to the composite repository 138. The composite repository 138 may, in some examples, include a processor or controller that is responsive to received requests. The composite repository 138 may receive a widget delivery request for delivery of the service widget to the user browser 123. For example, the widget delivery request may be a request for a specific service provided by the enterprise via the enterprise network 130. In some embodiments, the specific service may be a process for prequalifying a user for lender financing for purchase of an item (e.g., a vehicle). The widget delivery request, in some examples, may also include information related to an item available for purchase through the third-party network 110 as well as information usable to deliver a widget, such as an address of the user device 120 on the data network 160. The composite repository 138 may, in response to the widget delivery request, obtain a copy of the service widget 124 of the service widgets 139 and deliver the copy of the services widget 124 to the user browser 123. The delivered services widget 125 may include programming code that executes within a website, such as a website 117, executed by user browser 123. The website 117 may have multiple webpages as is known in the art.

In some examples, typically when a widget executes on a website, the website makes calls directly to the enterprise network 130, which may cause problems because the styling requirements and authorizations for using the enterprise network 130 may be different from one website to the next website. This may result in data being unsecured in some instances. In an example, a method to secure data is by not sending the data through the website as a proxy, but by having service widget make the calls to the enterprise network. The presence of the delivered service widget 125 improves the security of the website, and the user data transmitted to the enterprise network and to the enterprise network 130. To provide the improved functionality for the service widget 125, the website host, such as the client backend device 113 of the third-party network 110 may provide an endpoint address that enables the above-mentioned authentication process, such as OAuth, of the enterprise network 130 to verify the token 116 of the website.

In some examples, the enterprise network 130 may include additional components, such as a module repository 173 and a pipeline processing component 175. The module repository 173 may store a number of universal modules (shown in another example) that are programming code routines that each perform a specific function and are combinable to provide a user experience for collecting data and providing a service. The pipeline processing component 175 may be coupled to the module repository 173 and the composite repository 138. The pipeline processing component 175 may be operable to execute programming code stored in a memory (shown in another example).

The components of the enterprise network 130 may perform different functions and operations at different times. An example of the different functions and operations may be described with reference to FIGS. 2 and 3.

Figure 2:
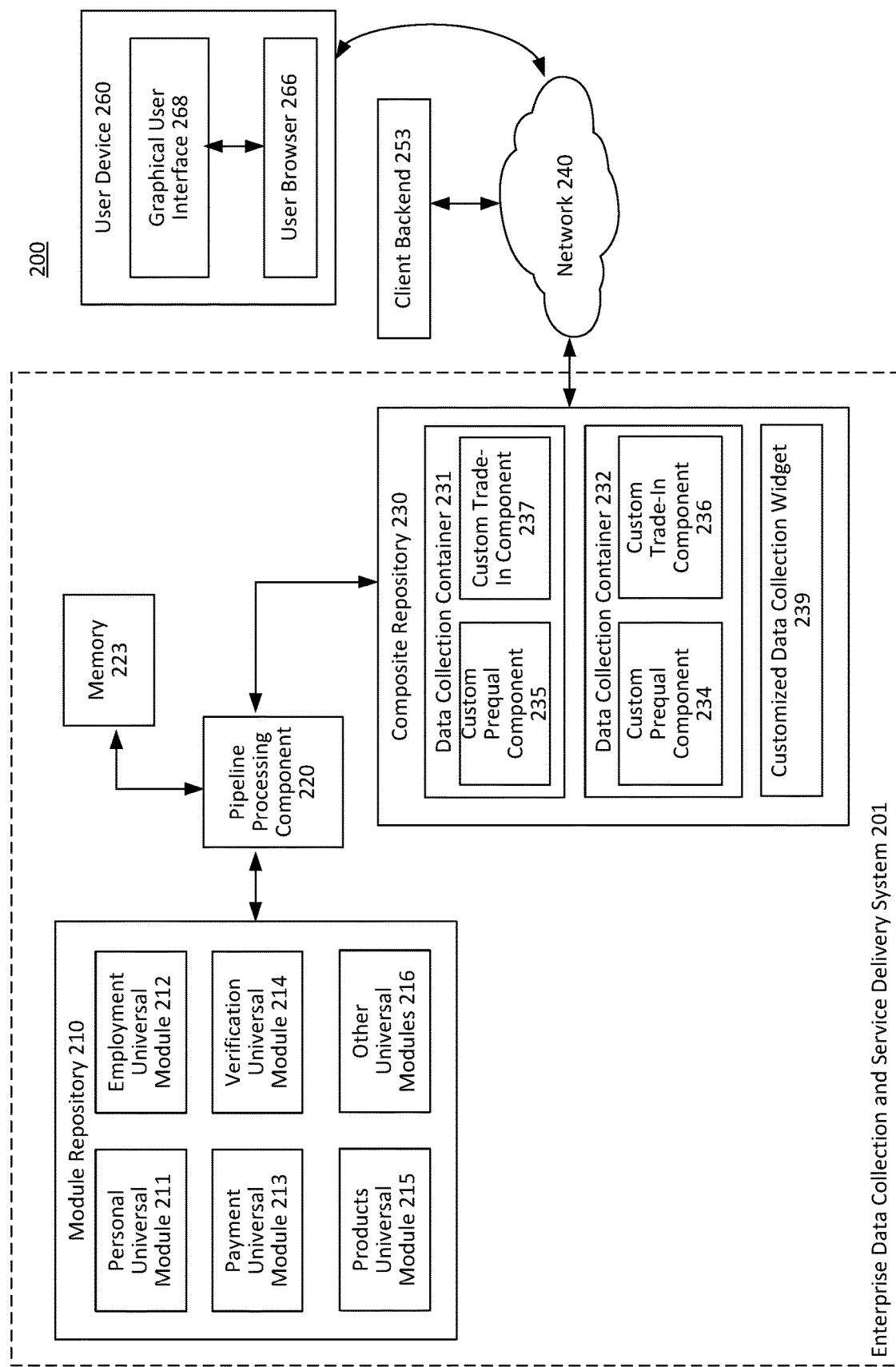
FIG. 2 illustrates an example of a system utilizing a data collection and service delivery component to implement an example of a widget build process.

FIG. 2 illustrates an example of a system utilizing a data collection and service delivery component to implement an example of a widget build process. The example build process may construct a service widget, such as 124 or 125 of FIG. 1, for collecting data via a user device. For example, the system 200 may be used to build a service widget that is deliverable to a website hosted by a client backend. The system 200 may include an enterprise data collection and service delivery system 201, a network 240, a client backend 253, and a user device 260. The enterprise data collection and service delivery system 201, the user device 260 and the client backend 253 may be coupled to the network 240. The network 240 may be a data network, such as a cellular network or the internet, or a number of interconnected data networks (e.g., a cellular network coupled to the internet or another network), or the like.

The user device 260 may include a user browser 266 that may be configured to access a website (e.g., 117 of FIG. 1 or the like) hosted by the client backend 253.

The enterprise data collection and service delivery system 201 may include a module repository 210, a pipeline processing component 220, a memory 223, and a composite repository 230.

The pipeline processing component 220 may also be coupled to the memory 223, the module repository 210, and the composite repository 230 of the enterprise data collection and service delivery system 201. The pipeline processing component 220 may be operable to execute the programming code stored in the memory 223 to perform different functions.

The module repository 210 may be operable to store a multitude of universal modules, such as 211-216. Each universal module 211-216 may include computer application code for rendering information on a display, data fields for storing data, and a data summary page of data requirements for the respective universal module. For example, personal universal module 211, employment universal module 212, payment universal module 213, verification universal module 214, products universal module 215, and other universal modules 216, such as a pricing module or the like, may each include computer application code specific to particular data to be collected and how the data may be processed. For example, the personal universal module 211 may encrypt all data input to the data fields for storing data, while the products universal module 215 may not perform any encryption.

In another example, the verification universal module 214 may be operable to extract data from the personal universal module 211 and the residence universal module 213 and process the extracted data according to the computer application code included in the verification universal module 214. The extracted data may, for example, be used when combining the respective universal modules, such as of the personal universal module 211, the residence universal module 213, and the verification universal module 214, in a container, such as data collection container 232, the data summary pages of each respective module is analyzed to verify or confirm that the data needed by the respective universal modules is provided.

Additional details related to the respective universal modules 211-216 are provided in the following examples with reference to FIGS. 3-5. For ease of discussion and illustration only six universal modules 211-216 are shown, but it should be understood that there may be many different universal modules, such as those classified under "other" in other universal modules 216, that perform different functions and collect and/or process various forms of data and information to provide services to a user via the client backend 253, a user browser 266, or the like. For example, each of the universal modules 211-216 may be customized using style pages and/or other programming to customize the presentation of the widget on a graphical user interface (GUI) 268 of the user browser 266 and the collection of data via the GUI 268. The user browser 266 and GUI 268 may respectively be any compatible browser, and graphical user interface known in the art or may be custom software components built to provide known browser and GUI functions.

The composite repository 230 may store a number of data collection containers, such as data collection containers 231 and 232. Each data collection container 231 or 232 may be a logical data storage of a data storage device with each data collection container potentially including two or more selected universal modules from the many universal modules in the module repository 210 that may be customized into custom components and coupled together to form a data collection component, such as 235, 237 and 234 and 236. The custom components may be, for example, a custom prequalification (prequal) component 235, custom trade-in component 237, and each custom component may include computer application code that enables, among other functions, the collection of data related respectively to prequalifying a user for a loan (e.g., 235 and 234) or providing a value for an item that is to be traded-in (e.g., 236 and 237) to the third party. The respective data collection containers 231 and 232 may be coupled together to produce a widget, such as a customized data collection widget 239 that, for example, collects data for prequalifying a user for a loan, such as an automobile loan, and for data related to an item for trade-in, such as an automobile or the like. The customized data collection widget 239 may be presented via a modal dialog box in a website in a graphical user interface 268 of a user browser 266.

The enterprise data collection and service delivery system 201 may be coupled to the network 240 that may be coupled to client backend 253 as well as to user device 260 via the user browser 266. Data may be provided by the user device 260 to the enterprise data collection and service delivery system 201 via the graphical user interface 268 and user browser 266, and vice versa.

In an example, the system 200 illustrated in FIG. 2 may be used to enable a client, such as a financial entity, to provide loan prequalification services to a user. It may be beneficial to describe an operational example with reference to FIGS. 2 and 3 of a process by which the respective data collection containers and the customized data collection widget 239 in the composite repository 230 may be built from the universal modules in the module repository 210.

In the example, each custom component 234-237 may have its own build process which may be started by a root build from a universal module 211-216 stored in the module repository 210. In more detail, universal modules 213-216 may be combined to form a data collection container, such as 231 and 232, that may perform a specific function (which may include multiple steps). The specific functions may be realized by execution of programming code, such as JavaScript or the like. To perform multiple functions, the data collection containers may be combined to form a customized data collection widget, such as 239. The customized data collection widget 239 may be stored as a service widget in the composite repository 230.

After a build of a widget is completed, JavaScript files, for example, for each custom component 234-237 may be generated and may be imported as a NodeJS dependency for each build of a data collection container 231 or 232 and a subsequently a separate widget, such as customized data collection widget 239 that provides a custom experience as requested by an external party via the user device 260.

The pipeline processing component 220 may, for example, receive a selection of several universal modules for inclusion in a widget to be presented on a website (310). In an example, each respective universal module of the several selected universal modules may include executable programming code that causes rendering of user-fillable data fields and presentation elements in a graphical user interface on a display device related to the rendering of the fillable data fields, and a data summary page that may include data requirements of the respective universal module.

In the operational example, the pipeline processing component 220 may perform functions, such as selecting a first universal module from the plurality of universal modules stored in the module repository. The selected first universal module may be, for example, the personal universal module 211, which may be configured to obtain first data (e.g., personal information such as username, date of birth, government identifier number or the like) from a user interface, such as graphical user interface 268. Upon selection of a first universal module from the number of universal modules, a second universal module may be selected from the number of universal modules stored in the module repository. The selected second universal module may be configured or operable to obtain second data (e.g., trade-in information, residence information, income information, or the like) from the user interface.

The customized data collection widget 239 may be created using JavaScript or any programming language that compiles to JavaScript. Each customized data collection widget 239 may have a potentially unique data input and presentation flow as built using the pipeline processing component 220. The customization available for producing the customized data collection widget 239 allows for the creation of a scalable, integrable, reusable, and isolated user interface, such as 268.

A data input and presentation flow may be requested by a third-party website as part of their onboarding process to the platform. For example, the third-party, such as an automobile dealership, may want an automobile dealership website to have a predetermined data input and presentation flow. The predetermined data input and presentation flow may be defined by a set of and a presentation order of screens to be within a modal window by the widget to a customer as they flow through the prequalification process. For example, one automobile dealership may want users to be first presented with a page for an input for name, social security number, and date of birth, followed by a screen to enter an address and previous residence information. Another third party, or another entity that is using enterprise widgets, may want to customer to enter employment information before processing to the screen with address information. Modular components (such as employment universal module 212 or personal universal module 211) support the build pipeline provided by the pipeline processing component 220 that generates the correct flow requested by third party websites via a determined order of components.

The capability to evaluate the data dependencies between the universal modules (e.g., 211-216) allows for the creation of a widget using JavaScript having a predetermined and customized data input and presentation flow that enhances a user's "user experience" with the customized data collection widget 239. In the automobile dealer example, preventing a disconnect between a prequalification data input and presentation flow and other data input and presentation flows on an automobile dealer website drives the deployment pipeline of the widget. Each data input and presentation flow, such as a prequalification data input and presentation flow, may have a defined build process in which the pipeline processing component 220 aggregates the respective universal modules 213-216 or containers 231 or 232 to build a widget have the respective data input and presentation flow desired by the automobile dealer. The pipeline processing component 220 may combine the respective universal modules or containers into a single JavaScript widget file based on the evaluation of the data dependencies of respective universal modules of the widget gleaned from the data summary pages of the respective universal modules. Any changes to a container or a universal module may result in a new build that dynamically updates the widget that client dealer sites will fetch. The pipeline processing component 220 may create updated or new widget files for each data input and presentation flow and uploads the updated or new widget files to a centralized location, such as the composite repository 230, for request by and download to the third-party website presented on a graphical user interface, such as 268.

Each respective universal module of the several selected universal modules includes a data summary page. A data summary page may include data requirements of the respective universal module, and may, for example, be used to identify data dependencies between respective universal modules. The selected several universal modules may be retrieved (320) from the module repository 210.

The selected several universal modules may be combined in a customized data collection container (330) based on the data requirements in the data summary page of each respective universal module. The customized data collection container may be uniquely identified by a data collection container identifier. For example, the pipeline processing component 220 may analyze the respective data summary pages of each of the selected several universal modules to identify data dependencies. Based on the identified data dependencies being valid, the pipeline processing component 220 may couple the selected second universal module to the selected first universal module to form a first set of coupled modules in a customized data collection widget. The executable programming code of the customized data collection widget may be modified based on data requirements in each of the respective data summary pages of the selected several universal modules in the customized data collection container and/or other universal modules in the one or more other data collection containers.

Alternatively, in another example, a first selected universal module, such as personal universal module 211, may be operable to submit the data summary page of the first selected module to a second selected module, such as employment universal module 212, for preliminary validation by the second selected module. For example, the submitted data summary page may be used to identify data dependencies between the first selected universal module and the second selected universal module. The second selected universal module may be operable, upon receipt of the data summary page of the first selected module, to evaluate the data summary page of the first selected module to confirm that any data obtained via the data fields presented by the first selected module is valid. If valid, the selected second universal module may cause the rendering of the data input and presentation flow of the second universal module in the graphical user interface.

The selected several universal modules may be coupled into the first set of coupled universal modules. Upon coupling the selected several universal modules into a first set of coupled universal modules based on the identified data dependencies from the respective data summary pages of the selected several universal modules, a uniquely-identified and customized data collection container, such as 231 or 232, may be populated with the first set of coupled universal modules, such as 235 and 237 in data collection container 231 and 234 and 236 in data collection container 232. A unique identifier for a data collection container may be formed from a unique sequence of bits, alphanumeric characters or the like. As such, the data collection container, e.g., 231 may include the first set of coupled modules, that respectively provide the custom prequalification ("prequal") component 235 and custom trade-in component 237 of data collection container 231. The uniquely-identified, customized data collection container populated with the first set of coupled universal modules may be stored in the composite repository 230 with a plurality of other data collection containers (340). In the examples, each of the one or more universal modules that collect data different from data collected by the selected several universal modules in the first set of couple universal modules stored in the customized data collection container.

As process 300 proceeds, the customized data collection container and one or more other data collection containers may be selected, at 350, from other data collection containers in the composite repository 230 or another data storage (not shown). In some examples, each of the one or more other data collection containers includes universal modules that collect data that is different from the data collected by the several combined universal modules in the customized data collection container. Alternatively, each of the one or more other data collection containers from the plurality of other data collection containers may include one or more universal modules that collect data different from one another, and that is different from the data collected by the selected several universal modules in the customized data collection container.

The selected customized data collection container and the selected one or more other data collection containers may be combined to form a customized data collection widget (360).

The production of the customized data collection widget by combining the selected customized data collection container and the selected ones of the data collection containers may include additional steps within the process 300. Additional steps may include, for example, identifying a client style for each of the selected several universal modules in the customized data collection container. Furthermore, the identified client style may be based on an input from a third party, such as a user via the graphical user interface 268 of user device 260. For example, a universal style may be identified for each of the selected several universal modules in the customized data collection container. In this example, the identified universal style may be based on the data obtained by each respective universal module of the selected several universal modules. The identified client style and identified universal style may be compiled as presentation elements into the executable code stored in each of the selected several universal modules in the customized data collection container. For example, the identified client style elements and the identified universal style elements may provide programming code that builds a website widget having an appearance exclusive to the customized data collection widget.

Alternatively, or in addition, the combining of selected customized data collection container having the combined selected several universal modules and the one or more other data collection containers to form the customized data collection widget may include one or more validation steps. For example, each of the selected several universal modules may be validated based on a comparison to the data summary page included in each of the selected several universal modules. Upon successful validation of the selected several universal modules, the data to be collected by the customized data collection widget may be further validated based on a comparison to a data contract related to a service associated with the customized data collection widget. In an automobile purchase example, a prequalification process may have certain data that is required to meet minimum standards for evaluating creditworthiness and ultimately extending the offer of an automobile loan. A prequalification data contract may outline the certain data required to meet the minimum standards.

In a further example, in response to a successful validation based on results of the comparison of the data to be collected by the customized data collection widget to the data contract, an indication may be generated that indicates to a recipient (e.g., the pipeline processing component, the client backend, user browser or the like) that the customized collection widget is suitable for distribution to the third party that sent the received selection of the several universal modules. The pipeline processing component 220 may assign a unique identifier to the customized data collection widget to identify the customized data collection widget from other widgets stored in the composite repository 230.

In another example, the pipeline processing component 220 may perform functions in response to a request to combine (or couple) two or more data collection containers from the composite repository to provide a data collection widget for delivery to a website associated with the user interface. In a specific example, the pipeline processing component 220 may, prior to completing the combining (or coupling) of the first selected universal module with the second selected universal module, validate the first selected universal module by comparing the data obtained by the first selected universal module with the data collection requirements in the data summary page of the first selected universal module. In addition, the second selected universal module may be validated by comparing the data obtained by the second selected universal module with the data collection requirements in the data summary page of the second selected universal module.

The pipeline processing component 220, prior to storing the container populated with the first set of coupled universal modules in the composite repository, may identify another container stored in the composite repository that is to be associated with the customized data collection container populated with the coupled universal modules. For example, the other container may include a second set of coupled universal modules operable to obtain data different from the data obtained by the first set of coupled universal modules. The pipeline processing component 220, when coupling the selected second universal module to the first universal module to form a first set of coupled modules, may compile the computer application code in the selected first universal module and the selected second universal module into executable programming code for rendering of the data fields of the selected first universal module and selected second universal module in a website, such as 117 of FIG. 1.

Returning to step 370 of process 300 in FIG. 3, the customized data collection widget may be delivered to a composite repository 230 for later delivery to a user for utilization of services provided by the widget. For example, the customized data collection widget may be distributed to a uniform resource identifier associated with a website of a third-party. The customized data collection widget may be used by other enterprises, such as the third-party that hosts the third-party network 110 of FIG. 1, obtain data from users that may obtain services from the third party with additional services being provided via the customized data collection widgets stored in the composite repository 230.

In a specific example of the implementation of the process 300 by, for example, a car dealer, when a user, who may be a potential car buyer, navigates to a dealer website (e.g., 117), a service widget (that provides, for example, a prequalification process and service) is downloaded in response to an input to the website onto a graphical user interface of a user browser to render, for example, a prequalification process. The service widget may be downloaded dynamically to the car dealer website because the website executing on a user or client web browser may not be enabled to save or cache the JavaScript of the service widget due to dynamic updating of the service widget to accommodate enterprise network or client backend changes that may be unfeasible to communicate to every dealer site.

Figure 4:
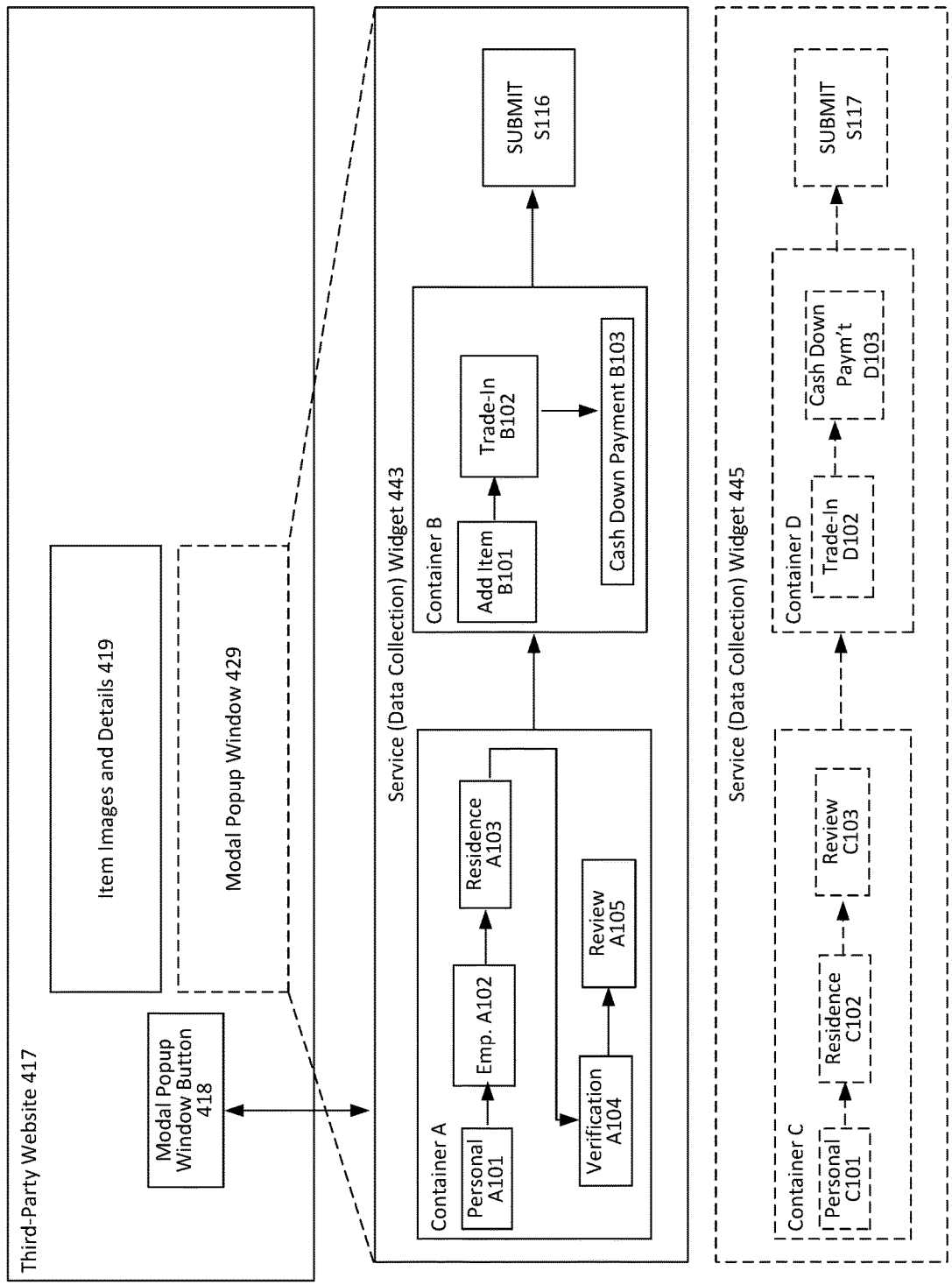
FIG. 4 shows an example of a third-party website and examples of modules used to construct data collection containers dynamically built according to examples of the processes and systems described herein.

FIG. 4 shows an example of a third-party website and examples of modules used to construct data collection containers dynamically built according to examples of the processes and systems described herein. In the illustrated example, third-party websites may utilize the services offered via the customized data collection widgets stored, for example, in the composite repository 230. For example, a user wishing to purchase an item viewed on a website of a third party may interact with a customized data collection widget, such as 239 stored in the composite repository 230 of FIG. 2 to obtain services related to the item for purchase and the purchase of the item.

The third-party website 417 may be presented on a user device, such as 120 of FIG. 1, and may include areas that selectively render item images and details 419 of items for purchase and a modal popup window button 418. Selection of the modal popup window button 418 may result in a service widget (also referred to as a data collection widget), such as 443 or 445, being called, delivered and presented in a modal popup window 429 or the like on the third-party website 417. In an example, the service widget 443 may be coupled to the modal popup window button 418. In response to activation of the modal popup window button 418, the website 417 may be present the service within a modal popup window 429 of a graphical user interface of the third-party website 417. Depending upon the function or service that is to be provided by the modal popup window button 418, either service (data collection) widget 443 or 445 may be provided in the modal popup window 429.

In an example, the integration with the third-party website 417 may, for example, utilize a hypertext markup language (HTML) <div> tag with the correct identifier to be added on the website page where necessary and a script tag added for the loader script. Custom run-time styling of the modal popup window 429 may be supported for any third-party site to modify the appearance of the widget, such as 443 or 445, and its components as desired by the third-party hosting the website.

In response to a request for delivery of a service widget generated via activation of the modal popup window button 418, the service widget 443 may be downloaded to a modal popup window on a third-party website 417, such as an automobile dealer website. In some examples, the loading of the service widget on the third-party website 417 may be done, for example, via a bootstrap script that functions as a loader script for fetching the actual service widget file. In this example, it is beneficial to use the loader script due to the added performance benefit to the rendering time on a customer browser. The delivered (or distributed) service widget includes executable programming code that enables rendering of user-fillable data fields on a display device and presentation elements (e.g., style elements or the like) related to the rendering of the user-fillable data fields.

In an example, when integrating with the enterprise network, such as 130 of FIG. 1, code within the HTML <div> tag that is populated when the widget 443 is loading may be an entry point where a user on the automobile dealer website can begin entering data as part of a prequalification process. After a user has entered their personal information and initiated the submit button (e.g., S116), the user's data may be encrypted and sent to the enterprise network 130. For example, the encrypted user's data may be sent to the services authorization component 133 of the enterprise network 130, which may be operable to process the encrypted user's data. The user's data may, for example, be part of a prequalification application and portions of the user's data may be shared with the third-party website as requested.

The respective service (data collection) widget 443 or 445 may present different data input options for a user device, such as 120 of FIG. 1. For example, the service (data collection) widget 443 may include two containers A and B. Container A may include several coupled universal modules, such as Personal A101, Employment (Emp.) A102, Residence A103, Verification A104, and Review A105 that collect data related to a user of the user device in a particular order. The data collected by container A may be provided to container B. Container B may include several coupled universal modules, such as Add Item B101, Trade-In B102, and Cash Down Payment B103, that collect data related to an item that the user may wish to purchase, trade-in information or cash down payments in a particular order. After properly inputting the requested information, a user may select the submit button S116, which causes the widget 443 to forward the inputted information to enterprise network for evaluation and processing. Alternatively, selection of the modal popup window button 418 may cause service (data collection) widget 445 to be presented in the modal popup window 429. In this example, the service (data collection) widget 445 may include two containers C and D. Container C may include several coupled universal modules, such as Personal C101, Residence C102, and Review C103, that collect data related to a user of the user device in a particular order. The data collected by container C may be provided to container D. Container D may include a several coupled universal modules, such as Trade-In D102 and Cash Down Payment D103 that collect data related to trade-in information or cash down payments in a particular order.

An example of a process for delivering the service widgets 443 or 445 to a user device may be explained with reference to the flowchart of FIG. 5. The process 500 illustrated in the example flowchart of FIG. 5 may include a process step (510) of receiving at a component in an enterprise network a widget delivery request for delivery of a service (data collection) widget to a user browser may receive a request from a third-party network. The received widget delivery request may be a request that includes an identifier of the requested, customized data collection widget (or service) may for a specific service provided by an enterprise and available by inputting the widget delivery request to a dedicated network entry point of a network, such as the enterprise network 130 of FIG. 1. The widget delivery request may be a request for a widget that enables a specific service, such as a prequalification loan service, an authentication service to be provided by an enterprise, or the like. For example, as explained above with respect to the example of FIG. 1, the services authorization component 133 or other enterprise network component may receive the widget delivery request including the requested, customized data collection widget identifier.

The process 500 may proceed in response to the widget delivery request; the service widget may be delivered to the client backend system (520) for loading onto the website. The delivered service widget may be operable to enable a user browser to request item-related services, such as loan prequalification, enhanced shipping options, affinity rewards, tax services, or the like.

After receiving the widget at 520, a user may enter their data in the different modules within the widget or retrieves, for example, their prequalification information from the enterprise network; some or all of the prequalification information may be stored in a temporary namespace to pass data between different modules. Storing the information benefits performance and significantly improves the data collection and presentation flow within the website. Scalability is easier using the described process, as more control is given to the service widget rather than placing the burden of extra work on each third-party website. For example, the enterprise network may include a proxy layer that filters any personal information so that no sensitive data is stored on the temporary namespace when a user retrieves their prequalification information. When a user navigates away from the webpage of the website or hits a submit button to exit the data input and presentation flow, any data on the namespace is cleared to prevent information from being cached or stored on the user's browser.

At 530, a services request may be received from the service widget for the item-related services. In some examples, the services request may include information related to an item available for purchase. In additional examples, the services request may include information related to an item available for purchase and information related to an individual or a user of the user browser making the services request. For example, in some instances, a user of the user browser may make the services request on behalf of an individual, such as a client or the like.

The received services request may be sent to an enterprise evaluation server for analysis of the information included with the services request. In an example related to an automobile dealer, data related to the vehicle available for purchase (e.g., sales price and Vehicle Identification Number (VIN)) may be included in the received services request and provided to the enterprise evaluation server, such as 137 of FIG. 1, for processing.

The evaluation enterprise server may generate an evaluation response as a response to the analysis of the information related to the item available for purchase. In response to the analysis (540), an indication may be received, such as the evaluation response, from the network of the enterprise that the item available for purchase meets a purchase threshold of the enterprise.

An authentication token, such as token 116 of FIG. 1, may be fetched from the client backend system; forwarding the authentication token with substantially all communications from the client back end to the enterprise's network (550). Upon confirmation that the fetched authentication token is valid for the client backend system, the services request is delivered to an enterprise evaluation server (560). In some examples, item information related to an item available for purchase and user information related to the user making the services request may be stored in a temporary namespace. In addition to delivering the services request to the enterprise evaluation service, the stored item information and the stored user information may be passed to the enterprise evaluation server with the delivered service request.

An evaluation result may be received from the enterprise evaluation server (570). The evaluation result may include parameters of the item-related services with respect to the item available for purchase as well as other parameters, such as confirmation of enterprise data, e.g., enterprise address, and individual-provided information, such as residence information, or the like. Alternatively, or in addition, the parameters may include details related an offer of services, such as, in an automobile loan example, an interest rate, a loan term, loan conditions, or the like, to the individual making the services request with respect to the item available for purchase. The details related to the offer of services may be specific to the user (e.g. based on user specific qualification information). In response to receiving an evaluation result from the enterprise evaluation server, a confirmation message may be transmitted to the client backend (580). The confirmation message may confirm that the enterprise will provide the item-related services. The confirmation message may also include terms and conditions of the items-related services. For example, the customized data collection widget may be distributed to a uniform resource identifier associated with the third party. In addition, or alternatively, the evaluation result may be delivered to the user browser for presentation of the evaluation result.

In some examples, the process 500 may also include process steps that occur prior to step 510. For example, prior to receiving the widget delivery request from the client backend system, receiving at the network of the enterprise an authentication token request from a client backend system for an authentication token. In addition to the authentication token request, the enterprise network 130 may also receive information related to the client backend system and information related to a third party administering the client backend system wherein the authentication request includes information that uniquely identifies the client backend system; and in response to confirming an identity of the client backend system, delivering the authentication token to the client backend system, wherein the authentication token enables the client backend system to confirm to the network of the enterprise that the client backend system is permitted to request services via the enterprise's network.

Figure 6A:
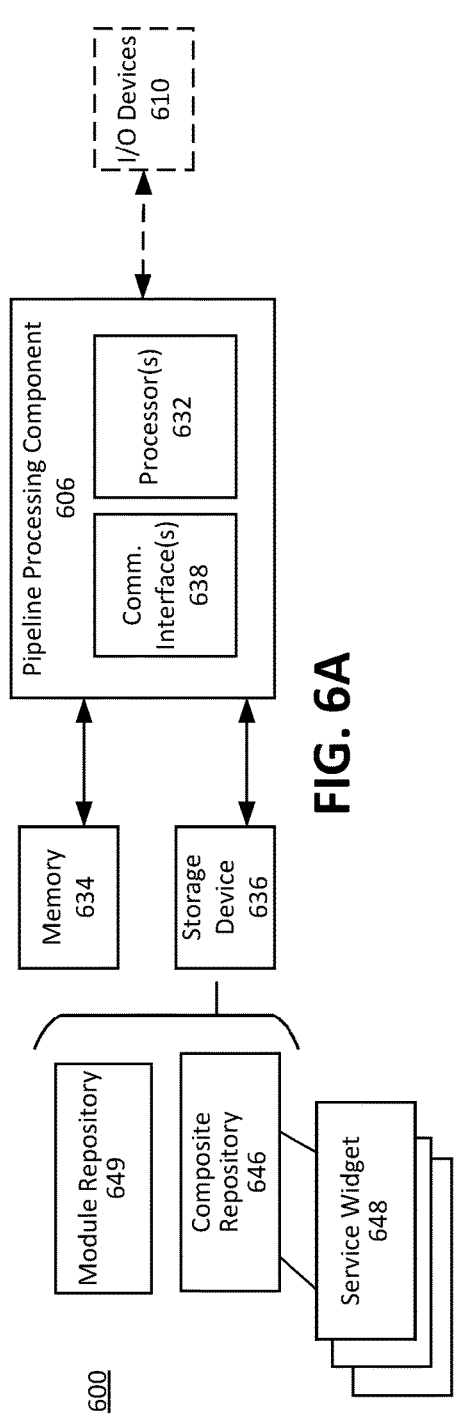
FIGS. 6A-C illustrate examples of apparatuses suitable for implementing various examples as described in the examples of FIGS. 1-5.
Figure 6B:
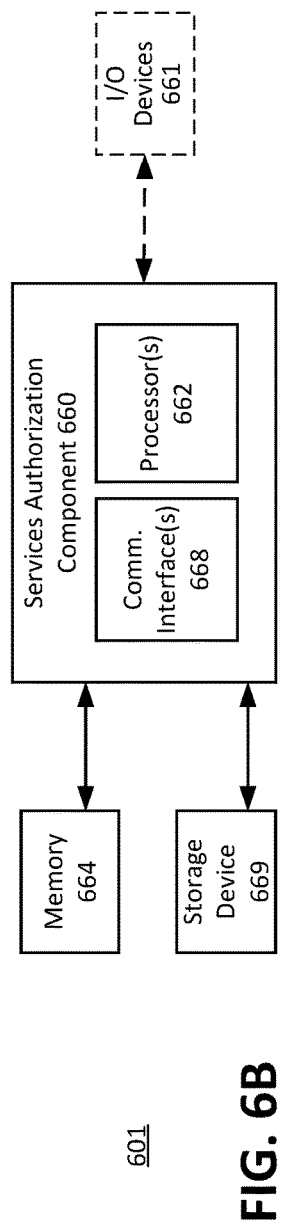
Figure 6C:
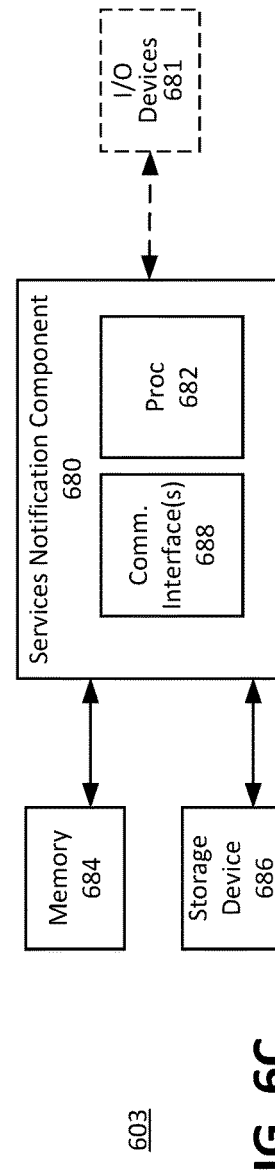

FIGS. 6A-C illustrate examples of apparatuses suitable for implementing various examples as described in the examples of FIGS. 1-5.

The apparatus 600 may include several components, such as the pipeline processing component 606, memory 634 and storage device 636. The pipeline processing component 606 may include several components that may perform one or more operations as discussed herein. The pipeline processing component 606 includes one or more processor(s) 632, one or more communication (comm.) interface(s) 638 that may be coupled to a memory 634 and storage device 636. The pipeline processing component 606 may also be coupled to input (I/O) devices 610 to enable output to a user device or another component or system of an enterprise network.

In some examples, the pipeline processing component 606 may be a processing system that includes one or more servers or computing devices that are interconnected via one or more network links, e.g., wired, wireless, fiber, etc. In some instances, the transaction services system may be a distributed computing system. Each of the servers may include one or more processor(s) 632, which may include one or more processing cores to process information and data. Moreover, the one or more processor(s) 632 can include one or more processing devices, such as a microprocessor manufactured by Intel™, AMD™, or any of various processors. The disclosed examples are not limited to any type of processor(s).

Memory 634 can include one or more memory (volatile or non-volatile) devices configured to store instructions used by the one or more processor(s) 632 to perform one or more operations consistent with the disclosed examples. For example, memory 634 can be configured with one or more software instructions, such as programs that can perform one or more operations when executed by the one or more processor(s) 632.

As mentioned, the pipeline processing component 606 may include one or more processor(s) 632 and communication interface(s) 638. The pipeline processing component 606 may be a processing system that includes one or more servers or computing devices that are interconnected via one or more networking links, e.g., wired, wireless, fiber, etc. and is capable of processing information and data from the service provider data sources, activities and external data sources. In some instances, the pipeline processing component 606 may also be a distributed computing system. Each component of the distributed computing system may include one or more processor(s) 632, which may include one or more processing cores to process information and data. Memory 634 can include one or more memory (volatile or non-volatile) devices configured to store instructions used by the one or more processor(s) 632 to perform one or more operations consistent with the disclosed examples. For example, the memory 634 may store programming code and other computer-readable code that enables the pipeline processing component 606 to perform operations and functions as described with reference to the foregoing examples as well as other operations and functions, such as processing of information, generation of notifications and communicating with computing devices.

In examples, the pipeline processing component 606 may be coupled to one or more storage devices 636. The storage devices 636 may include hard disc drives (HDDs), flash memory devices, optical storage devices, floppy storage devices, or the like. In some instances, the storage devices 636 may include cloud-based storage devices that may be accessed via a network interface. In some examples, the storage device 636 may be configured to include the module repository 649 and the composite repository 646.

The module repository 649 may store a number of universal modules such as those described above with respect to earlier examples. The composite repository 646 may include one or more data structures and/or a distributed database system. In addition, the composite repository 646 may also store one or more service widgets, such as service widget 648, for distribution. Each service widget, such as

648, may include computer application code that when executed causes for rendering the data input fields in a modal window of a browser that is presenting a web site hosted by a third party and storing the data input into the data input fields transmitting to a computing device, such as a services authorization component (shown in FIG. 6B), for processing.

The pipeline processing component 606 includes one or more communication interface(s) 638. The one or more communication interface(s) 638 can include one or more digital and/or analog communication devices that allow the pipeline processing component 606 communicate with other machines and devices, such servers and systems related to the services provided by the enterprise service providers. The one or more communication interface(s) 638 may communicate via any type of connection, e.g., wired, wireless, optical, and so forth. These interfaces 638 may include network adapters and/or modems to communicate with the systems and/servers of the enterprise service providers.

The services authorization component 660 of apparatus 601 in FIG. 6B may include one or more communication interface(s) 668, one or more processor(s) 662 and be coupled to memory 664 and storage device 669. In addition, the services authorization component 660 may also be coupled to input (I/O) devices 661 to enable input from or output to a user device or another component or system of an enterprise network.

The structure of the one or more processor(s) 662 may be like that of one or more processor(s) 632 of FIG. 6A. But, in contrast to the pipeline processing component 606, the services authorization component 660 may, upon execution of programming code stored in memory 664, be operable to fetch an authentication token from a client backend device, such as 113 of FIG. 1, and upon confirmation that the authentication token is valid for the client backend device, the services authorization component 660 may deliver the services request to an enterprise evaluation server, such as 137 of FIG. 1. In response to delivering the services request, the services authorization component 660 may receive an evaluation result from the enterprise evaluation server. The received evaluation result may include parameters for an offer of services with respect to the item available for purchase. In addition, the services authorization component 660 may, in response to receiving an evaluation result from the enterprise evaluation server, transmit a confirmation message to the client backend device. The confirmation message may be interpreted by the client backend device as a confirmation that the enterprise will provide item-related services.

In addition, the services authorization component 660 may be coupled to a service widget, such as 648 of FIG. 6A that has been delivered to a client or user browser. In another example, the services authorization component 660 may be operable to store information identified for a service requested by the service request in a temporary namespace, such as in memory 664. The stored information may, for example, be the minimum amount of information needed for evaluation by the enterprise evaluation server, such as the enterprise evaluation server 137 of FIG. 1. The services authorization component 660 may further be operable to pass the stored information to the enterprise evaluation server with the delivered service request.

As shown in FIG. 6C, apparatus 603 may include several components, such as the services notification component 680, memory 684 and storage device 686. In addition, the services notification component 680 may also be coupled to input (I/O) devices 681 to enable input from or output to a user device or another component or system of an enterprise network. The services notification component 680 may include several components that may perform one or more operations as discussed herein. For example, the services notification component 680 may include one or more processor(s) 682 and one or more communication interface(s) 688. In addition, the services authorization component 660 may also be coupled to input (I/O) devices 661 to enable output to a user device or another component or system of an enterprise network.

The one or more processor(s) 682, which may include one or more processing cores to process information and data. Moreover, the one or more processor(s) 682 can include one or more processing devices, such as a microprocessor manufactured by Intel™, AMD™, or any of various processors. The disclosed examples are not limited to any type of processor(s).

The one or more communication interface(s) 688 can include one or more digital and/or analog communication devices that allow the services notification component 680 communicate with other machines and devices, such servers and systems related to the services provided by the enterprise service providers. The one or more communication interface(s) 688 may communicate via any type of connection, e.g., wired, wireless, optical, and so forth. These interfaces 688 may include network adapters and/or modems to communicate with the systems and/servers of the enterprise service providers. The examples are not limited in this manner. The services notification component 680 may be operable to perform several functions. For example, the services notification component 680 may receive a services request for item-related services from a service widget executing on a user browser. The received services request may include information related to an item available for purchase. The services notification component 680 may forward the information related to the item available for purchase to another computing component or server, such as the enterprise evaluation server 137 of FIG. 1. For example, if the item for purchase is an automobile, the services notification component 680 may in response to an analysis of the information related to the item available for purchase via a third-party network, receive an indication that the item available for purchase meets a purchase threshold of the enterprise. In response to receipt of the indication that the item available for purchase meets a purchase threshold, the services notification component 680 may forward the indication to the third-party network and the client browser. If the analysis determines that the item available for purchase does not meet the purchase threshold of the enterprise, the services notification component 680 may receive a negative indication which may be forwarded to the third-party network and the client browser.

The foregoing examples of an apparatus, such as 600, 601 and 603 are presented for explanation purposes and are not intended to be limiting.

Figure 7:
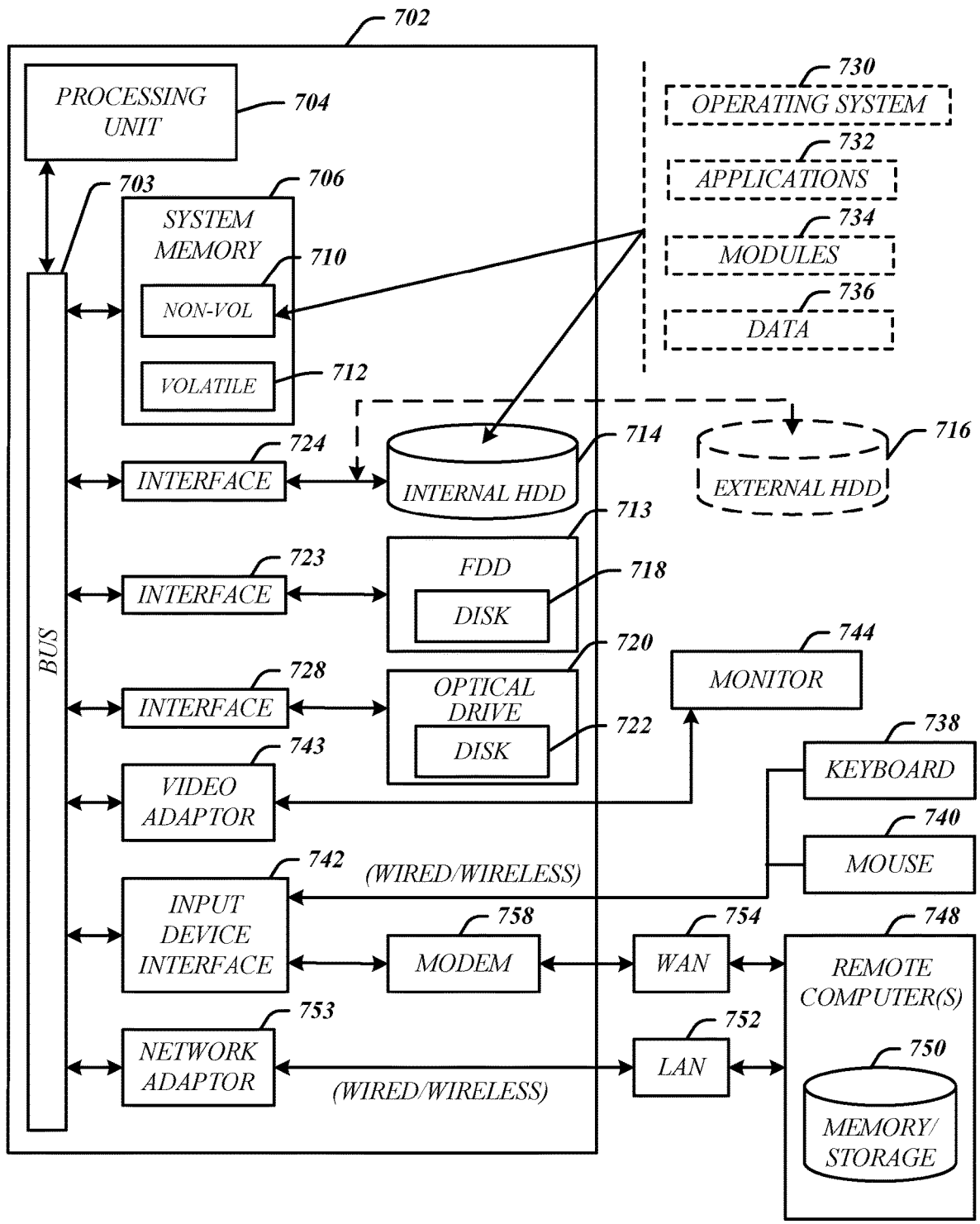
FIG. 7 illustrates an exemplary computing architecture suitable for implementing the various examples described with respect to FIGS. 1-6C.

FIG. 7 illustrates an example of an exemplary computing architecture 700 suitable for implementing various examples as previously described with respect to FIGS. 1-6C. In one example, the computing architecture 700 may be device or element that implements a part of interactive system 100. In another example, the computer architecture 700 includes components of an enterprise evaluation apparatus as well as other components that may optionally be part of a client backend device.

The computing architecture 700 includes various common computing elements, such as one or more processor(s), multi-core processors, co-processors, memory units, chip-sets, controllers, peripherals, interfaces, oscillators, timing devices, video cards, audio cards, multimedia input/output (I/O) components, power supplies, and so forth. The examples, however, are not limited to implementation by the computing architecture 700.

As shown in FIG. 7, the computing architecture 700 includes a processing unit 704, a system memory 706 and a system bus 703. The processing unit 704 can be any of various commercially available processors. For example, the third-party network 110 components, such as client backend device 113, client device 119 and user device 120 of FIG. 1 may incorporate one or more of the components of the computer architecture 700, such as the processing unit 704, the system memory 706 and so on. Other components, such as the keyboard 738 and the mouse 740, may be omitted in some examples of components, such as the enterprise evaluation server 137 of FIG. 1.

The system bus 703 provides an interface for system components including, but not limited to, the system memory 706 to the processing unit 704. The system bus 703 can be any of several types of bus structure that may further interconnect to a memory bus (with or without a memory controller), a peripheral bus, and a local bus using any of a variety of commercially available bus architectures. Interface adapters may connect to the system bus 703 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a non-transient computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processor(s) to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the example shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714 or external HDD 716, and an optical disk drive 720 to read from or write to a removable optical disk 722 (e.g., a CD-ROM or DVD). The internal HDD 714 and optical disk drive 720 can be connected to the system bus 703 by an HDD interface 724 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, several program modules can be stored in the drives and memories 710, 712, including an operating system 730, one or more application programs 732, other program modules 734, and program data 736. In one example, the one or more application programs 732, other program modules 734, and program data 736 can include, for example, the various applications and/or components of the computer architecture 700.

In an example, a user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 703 but can be connected by other interfaces such as a parallel port, IEEE 1394 serial port, a game port, a USB port, an IR interface, and so forth.

A display device 744 or another type of display device (e.g. monitor) may be also connected to the system bus 703 via an interface, such as a video adaptor 746. The display device 744 may be internal or external to the computer 702. In addition to display device 744, a computer typically includes other peripheral output devices, such as speakers, printers, and so forth. In some examples of an enterprise evaluation server and the like, a display device or the other peripheral output devices may be optional.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a remote memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies and facilitate enterprise-wide computer networks, such as intranets, all of which may connect to a global communications network, for example, the Internet.

When used in a LAN networking environment, the computer 702 is connected to the LAN 752 through a communication interface 756 that may be either wired and/or wireless. The communication interface 756 can facilitate wired and/or wireless communications to the LAN 752, which may also include a wireless access point disposed thereon for communicating with the wireless functionality of the communication interface 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 703 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

In some examples, the processing unit 704 of computer 702 may be operable to execute programming code stored in the system memory 706 or the internal HHD 714. The programming code may cause the processing unit 704 to perform functions as part of a process.

The various elements of the devices, apparatuses or systems as previously described with reference to FIGS. 1, 2, 4, 6A-C and 7 may include various hardware elements, software elements, or a combination of both. Examples of hardware elements may include structural members, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, computer application programs, system programs, software development programs, machine programs, operating system software, middleware, firmware, software modules, routines, subroutines, functions, methods, procedures, software interfaces, application program interfaces (API), instruction sets, computing code, computer code, code segments, computer application code, computer code segments, words, values, symbols, programming code, or any combination thereof.

As used in this application, the terms "system," "module" and "component" are intended to refer to a computer-related entity, either hardware, software, a combination of hardware and software, or software in execution, examples of which are provided by the exemplary computing architecture 700 as well as the examples described with reference to FIGS. 1-6C. For example, a component can be, but is not limited to being, a processor, a process running on a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data transactions. Such data transactions may be sent across various connections, such as for example, parallel interfaces, serial interfaces, bus interfaces or the like.

While the foregoing examples refer to contracts and the execution of documents, the above described examples may be useful and find practical application in other areas, such as manufacturing, supply chain applications, auctions and online marketplaces, advertising and media sales, healthcare, and education, inventory management, Internet-of-Things/Smart device/Autonomous devices, banking and financial services, eCommerce, hospitality, law enforcement, government operations, insurance or the like.

What is claimed is:

1. A non-transitory computer-readable storage medium storing computer-readable program code executable by a processor, wherein execution of the computer-readable program code causes the processor to:
  receive a selection of a first universal module for presentation in a graphical user interface, wherein the first universal module includes:
    executable programming code that causes rendering of user-fillable data fields and presentation elements related to user-fillable data fields in the graphical user interface, and
    a first summary page including data requirements of the first universal module;
  receive a selection of a second universal module for presentation in the graphical user interface, wherein the second universal module includes:
    executable programming code that causes rendering of additional user-fillable data fields and additional presentation elements related to the additional user-fillable data fields in the graphical user interface, and
    a second summary page including data requirements of the second universal module;
  provide the first summary page from the first universal module to the second universal module for preliminary validation;
  validate the first universal module based on a comparison between the first summary page and the second summary page; and
  upon validation, combine the first universal module with the second universal module in a customized data collection container usable by a customized data collection widget; and deliver the customized data collection widget to a website for presentation in the graphical user interface.

2. The non-transitory computer-readable storage medium of claim 1, further comprising computer-readable program code that when executed causes the processor to:
retrieve a data contract related to a service associated with the customized data collection widget;
evaluate data to be collected by the customized data collection widget with respect to data required for the data contract related to the service associated with the customized data collection widget; and
validate that the data to be collected meets a minimum standard for completion of the data contract.

3. The non-transitory computer-readable storage medium of claim 2, further comprises computer-readable program code that when executed causes the processor to:
in response to a successful validation based upon results of all comparisons, generate an indication that the customized data collection widget is suitable for distribution to a third party.

4. The non-transitory computer-readable storage medium of claim 1, wherein the first universal module collects data different from the second universal module.

5. The non-transitory computer-readable storage medium of claim 1, further comprises computer-readable program code that when executed causes the processor to:
modify programing code of the customized data collection widget based on data requirements in the first summary page.

6. The non-transitory computer-readable storage medium of claim 1, further comprises computer-readable program code that when executed causes the processor to:
modify programing code of the customized data collection widget based on data requirements in the second summary page.

7. The non-transitory computer-readable storage medium of claim 1, further comprises computer-readable program code that when executed causes the processor to:
provide the data collection container populated with a first set of coupled universal modules, comprising the first universal module and the second universal module, to a composite repository, the composite repository being configured for storing a plurality of data collection containers, wherein each container of the plurality of data collection containers includes two or more universal modules; and
in response to a request, combine two or more data collection containers from the composite repository to provide the customized data collection widget for delivery to the website associated with the graphical user interface.

8. A system, comprising:
a module repository included in a storage device that stores a plurality of universal modules that make up a data input and presentation flow, wherein each universal module includes computer application code that renders information on a display, data fields that store data, and a summary page of data requirements for each universal module; and
a pipeline processing component including a processor coupled to the module repository, wherein the pipeline processing component is operable to execute programming code, and the pipeline processing component when executing the programming code performs functions, including functions to:
receive a selection of a first universal module for presentation in a graphical user interface, wherein the first universal module includes:
executable programming code that causes rendering of user-fillable data fields and presentation elements related to user-fillable data fields in the graphical user interface, and
a first summary page including data requirements of the first universal module;
receive a selection of a second universal module for presentation in the graphical user interface, wherein the second universal module includes:
executable programming code that causes rendering of additional user-fillable data fields and additional presentation elements related to the additional user-fillable data fields in the graphical user interface, and
a second summary page including data requirements of the second universal module;
provide the first summary page from the first universal module to the second universal module for preliminary validation;
validate the first universal module based on a comparison between the first summary page and the second summary page; and
upon validation, combine the first universal module with the second universal module in a customized data collection container usable by a customized data collection widget; and
deliver the customized data collection widget to a website for presentation in the graphical user interface.

9. The system of claim 8, wherein the pipeline processing component is further operable to execute programming code causing the pipeline processing component to perform functions of:
retrieve a data contract related to a service associated with the customized data collection widget;
evaluate data to be collected by the customized data collection widget with respect to data required for the data contract related to a service associated with the customized data collection widget; and
validate that the data to be collected meets a minimum standard for completion of the data contract.

10. The system of claim 9, wherein the pipeline processing component is further operable to execute programming code causing the pipeline processing component to perform functions of:
in response to a successful validation based upon results of all comparisons, generate an indication that the customized data collection widget is suitable for distribution to a third party.

11. The system of claim 8, wherein the first universal module collects data different from the second universal module.

12. The system of claim 8, wherein the pipeline processing component is further operable to execute programming code causing the pipeline processing component to perform functions of:
modify programing code of the customized data collection widget based on data requirements in the first summary page.

13. The system of claim 8, wherein the pipeline processing component is further operable to execute programming code causing the pipeline processing component to perform functions of:

modify programing code of the customized data collection widget based on data requirements in the second summary page.

14. The system of claim 8, further comprising:
a composite repository storing a plurality of data collection containers, wherein each container of the plurality of data collection containers includes two or more universal modules,
wherein the pipeline processing component performs further functions to:
provide the data collection container populated with a first set of coupled universal modules, comprising the first universal module and the second universal module, to a composite repository; and
in response to a request, combine two or more data collection containers from the composite repository to provide the data collection widget for delivery to the website associated with the graphical user interface.

15. A method, comprising:
receiving a selection of a first universal module for presentation in a graphical user interface, wherein the first universal module includes:
executable programming code that causes rendering of user-fillable data fields and presentation elements related to user-fillable data fields in the graphical user interface, and
a first summary page including data requirements of the first universal module;
receiving a selection of a second universal module for presentation in the graphical user interface, wherein the second universal module includes:
executable programming code that causes rendering of additional user-fillable data fields and additional presentation elements related to the additional user-fillable data fields in the graphical user interface, and
a second summary page including data requirements of the second universal module;
providing the first summary page from the first universal module to the second universal module for preliminary validation;
validating the first universal module based on a comparison between the first summary page and the second summary page; and
upon validation, combining the first universal module with the second universal module in a customized data collection container usable by a customized data collection widget; and
delivering the customized data collection widget to a website for presentation in the graphical user interface.

16. The method of claim 15, further comprising:
retrieving a data contract related to a service associated with the customized data collection widget;
evaluating data to be collected by the customized data collection widget with respect to data required for the data contract related to a service associated with the customized data collection widget; and
validating that the data to be collected meets a minimum standard for completion of the data contract.

17. The method of claim 15, further comprising:
in response to a successful validation based upon results of all comparisons, generating an indication that the customized data collection widget is suitable for distribution to a third party that sent the received selection of the selected several universal modules.

18. The method of claim 15, wherein the first universal module collects data different from the second universal module.

19. The method of claim 15, further comprising:
modifying programing code of the customized data collection widget based on data requirements in the first summary page.

20. The method of claim 15, further comprising:
modifying programing code of the customized data collection widget based on data requirements in the second summary page.

* * * * *